US006367045B1

(12) United States Patent
Khan et al.

(10) Patent No.: US 6,367,045 B1
(45) Date of Patent: Apr. 2, 2002

(54) BANDWIDTH EFFICIENT ACKNOWLEDGMENT/NEGATIVE ACKNOWLEDGMENT IN A COMMUNICATION SYSTEM USING AUTOMATIC REPEAT REQUEST (ARQ)

(75) Inventors: Farooq Khan, Kirta; Stefan Jåverbring, Älvsjö; Anders Furuskär, Stockholm; Mattias Wallman, Sollentuna, all of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/345,961

(22) Filed: Jul. 1, 1999

(51) Int. Cl.[7] .............................. G08C 25/02; H04L 1/18
(52) U.S. Cl. ......................................................... 714/748
(58) Field of Search .......................................... 714/748

(56) References Cited

U.S. PATENT DOCUMENTS

| | | | | |
|---|---|---|---|---|
| 3,979,719 A | * | 9/1976 | Tooley et al. ............... | 714/748 |
| 4,422,171 A | * | 12/1983 | Wortley et al. ............. | 714/748 |
| 4,439,859 A | * | 3/1984 | Donnan ....................... | 714/748 |
| 4,617,657 A | * | 10/1986 | Drynan et al. .............. | 370/394 |
| 4,841,526 A | * | 6/1989 | Wilson et al. ............... | 714/748 |
| 5,235,595 A | * | 8/1993 | O'Dowd ....................... | 370/392 |
| 5,245,616 A | * | 9/1993 | Olson ........................... | 714/748 |
| 5,440,545 A | | 8/1995 | Buchholz et al. | |
| 5,477,550 A | * | 12/1995 | Crisler et al. ............... | 714/748 |
| 5,487,068 A | | 1/1996 | Smolinske et al. | |
| 5,553,083 A | | 9/1996 | Miller | |
| 5,717,689 A | | 2/1998 | Ayanoglu | |
| 5,727,002 A | | 3/1998 | Miller et al. | |
| 5,799,012 A | * | 8/1998 | Ayerst et al. ............... | 370/336 |
| 6,112,323 A | * | 8/2000 | Meizlik et al. ............. | 714/748 |

FOREIGN PATENT DOCUMENTS

| | | | |
|---|---|---|---|
| EP | 0 658 028 A2 | 6/1995 | |
| EP | 0 771 092 A1 | 5/1997 | |
| EP | 877513 A1 | * 11/1998 | .......... H04L/12/56 |
| EP | 0 877 513 A1 | 11/1998 | |
| GB | 2 313 268 A | 11/1997 | |

OTHER PUBLICATIONS

European Search Report dated Aug. 3, 1999.

* cited by examiner

*Primary Examiner*—Phung M. Chung
*Assistant Examiner*—Joseph D. Torres
(74) *Attorney, Agent, or Firm*—Burns, Doane, Swecker & Mathis, L.L.P.

(57) ABSTRACT

A method and technique are provided for efficiently acknowledging transmitted information in a system that employs variable rate data transmission, and skips data block sequence numbers depending on the transmission rate used. An RBB field in an ACK/NACK message includes a starting sequence number, an indication of a sequence number step, and a bitmap. The starting sequence number indicates a first block in a series or sequence of transmitted blocks that are being acknowledged via the ACK/NACK message. The sequence number step indicates a minimum difference between sequence numbers of blocks in the sequence. Where the sequence is ordered, the sequence number step is a difference between the sequence numbers of adjacent or consecutive blocks in the series. The bitmap is configured so that each bit in the bitmap represents an acknowledgment of one of blocks in the series. The RBB field can also include multiple starting sequence numbers, and both a sequence number step and a length for each starting sequence number. Each set of starting sequence number, sequence number step and length indicates a subseries or subsequence of the series of transmitted blocks that is being acknowledged via the ACK/NACK message. The starting sequence number indicates a sequence number of a first block in the subsequence, the length indicates how many blocks are in the subsequence, and the sequence number step indicates a difference between sequence numbers of adjacent blocks in the subsequence.

14 Claims, 6 Drawing Sheets

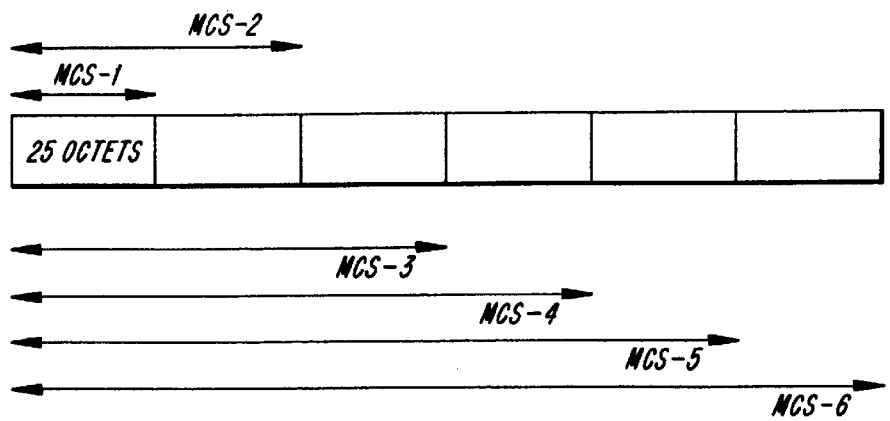
Fig. 1
PRIOR ART
| SCHEME | BLOCK SIZE (BITS) | CODE RATE | PAYLOAD PER BLOCK |
|---|---|---|---|
| MCS-6 (8-PSK) | 1392 | ≈1 | 150 OCTETS |
| MCS-5 (8-PSK) | 1392 | ≈5/6 | 125 OCTETS |
| MCS-4 (8-PSK) | 1392 | ≈2/3 | 100 OCTETS |
| MCS-3 (8-PSK) | 1392 | ≈1/2 | 75 OCTETS |
| MCS-2 (8-PSK, GMSK) | 1392, 464 | ≈1/3, 1 | 50 OCTETS |
| MCS-1 (GMSK) | 464 | ≈1/2 | 25 OCTETS |
Fig. 2
PRIOR ART
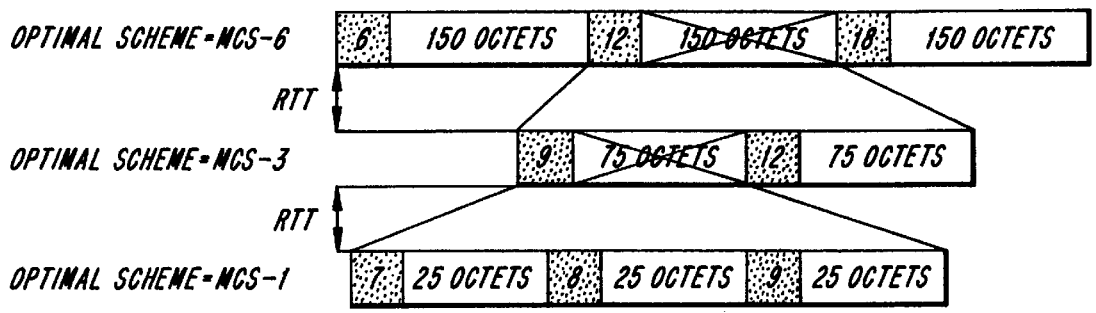
Fig. 3
PRIOR ART

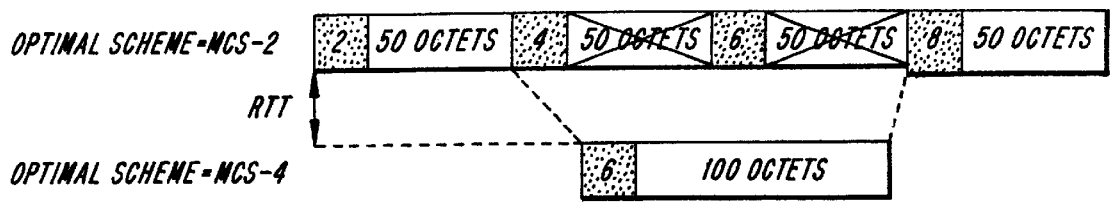
Fig. 4
PRIOR ART
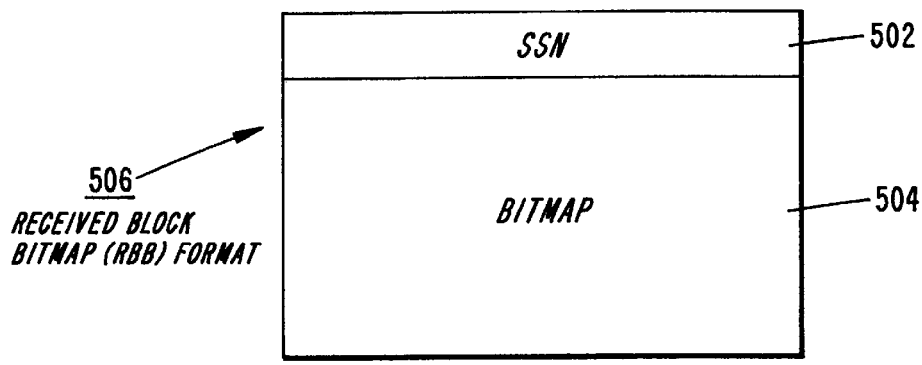
Fig. 5
PRIOR ART
Fig. 6
PRIOR ART

BANDWIDTH EFFICIENT ACKNOWLEDGMENT/NEGATIVE ACKNOWLEDGMENT IN A COMMUNICATION SYSTEM USING AUTOMATIC REPEAT REQUEST (ARQ)

FIELD OF THE INVENTION

The present application claims priority under 35 U.S.C. §119 to U.S. Provisional Patent Application No. 60/110,444, filed Nov. 27, 1998.

The present invention generally relates to error handling in the field of communication systems and, more particularly, to error handling using both automatic repeat request (ARQ) and variable rate transmission techniques in digital communication systems.

BACKGROUND INFORMATION

Variable rate transmission in a radio communication system can be achieved using several methods. For example, in a CDMA (Code Division Multiple Access) system the information transmission rate changes as a function of the spreading factor used for transmissions. In a TDMA (Time Division Multiple Access) system, variable rate transmission is generally achieved by using different numbers of time slots. In a TDMA system the data transmission rate also varies as a function of the modulation and coding scheme used for mapping data bits to channel bits/symbols.

EDGE Enhanced Data Rates for Global Evolution) is an example of a system that uses different modulation and coding schemes, in addition to a variable number of time slots, to achieve different transmission rates of user data. The different modulation and coding schemes used in the EDGE system, MCS-1 through MCS-6, have various payload sizes, differing for example in increments of 25 octets as shown in FIG. 1. FIG. 2 summarizes the different block sizes, code rates, and payload sizes for the different modulation and coding schemes MCS-1 through MCS-6. As indicated in FIG. 2, the modulation schemes can include PSK (Phase Shift Keying) and GMSK (Gaussian Minimum Shift Keying).

A block numbering scheme depending upon a payload in a block is disclosed in co-pending U.S. patent application Ser. No. 09/120,163, entitled "Method and Apparatus for Minimizing Overhead in a Communication System", which is hereby incorporated by reference. The basic principle of the numbering scheme is illustrated in FIG. 3.

As shown in FIG. 3, the block sequence numbers (SNs) can be integer multiples of an identification number of a currently used modulation and coding scheme, or can be separated by a step equal in magnitude to the identification number. For example, as shown in FIG. 3, where the current modulation and coding scheme is MCS-6, blocks in a sequence can be assigned sequence numbers 6, 12 and 18. The round trip time (RTT) shown in FIG. 3 refers to an amount of time that elapses between when one or more blocks are sent, and when acknowledgment for them is received. As shown in FIG. 3, the payload size of a block for a current modulation and coding scheme can be defined as a number of octets that is equal to a product of the identification number of the current modulation and coding scheme and a block size increment between modulation and coding schemes. For example, the block payload size of the MCS-6 modulation and coding scheme can be defined as (6)(25) octets=150 octets large.

When blocks of data are to be retransmitted at a rate that is lower than a rate at which the blocks of data were initially transmitted, the initially transmitted data can be resegmented into different size blocks, or different blocks having different payload sizes, and the different size blocks can be renumbered accordingly. For example, as shown in FIG. 3, block 12 of the MCS-6 scheme, containing a payload of 150 octets, can be resegmented into two blocks 9 and 12 each containing a payload of 75 octets, and then retransmitted in accordance with the MCS-3 scheme.

This procedure can be repeated as necessary or appropriate. If, for example, as shown in FIG. 3, the retransmitted block 9 is not correctly received, then it can be resegmented into three blocks 7, 8 and 9 each containing a payload of 25 octets in accordance with the MCS-1 scheme, and resent as the new blocks 7, 8 and 9.

Using the technique illustrated in FIG. 3, data can be retransmitted using a modulation and coding scheme that is appropriate at the time of retransmission. For example, the data can be retransmitted using a modulation and coding scheme that is optimal, and/or better at the time of the retransmission than the scheme used for the initial or previous transmission of the data.

Multiple blocks of data can also be resegmented into a fewer number of blocks for retransmission. For example, as shown in FIG. 4, where two blocks 4 and 6 of the scheme MCS-2 are corrupted and need to be retransmitted, and at the time of retransmission the scheme MCS-4 is optimal or otherwise appropriate, the two blocks 4 and 6 of the MCS-2 scheme can be combined to form the single block 6 of the scheme MCS-4 and retransmitted accordingly. The payload of the MCS-4 scheme block 6 can be formed by concatenating the payloads of the blocks 4 and 6 of the MCS-2 scheme. Note that when the optimal initial coding scheme is changed from MCS-2 to MCS-4 and the two blocks are combined, the resulting concatenated block is identified with the sequence number 6 of the second block. Alternatively, when a series of blocks are combined, the resulting combined block can be identified with the sequence number of any appropriate block in the series. For example, the combined block can be identified with the sequence number of the first block in the series, or the sequence number of the middle block, and so forth.

As shown in FIG. 5, ACK/NACK (positive acknowledgment/negative acknowledgment) messages can include a Received Block Bitmap (RBB) field format 506 having a Start Sequence Number (SSN) 502 followed by a bitmap 504. The bitmap 504 contains an acknowledgment for each possible sequence number in a sequence of data blocks starting with a block whose SN has the same value as that of the SSN 502. Thus, when this technique is used, a receiver must positively or negatively acknowledge all sequence numbers represented in an RBB field having the format 506, regardless of whether all of the sequence numbers are actually used to transmit data blocks.

FIG. 6 shows an RBB field 606 having the format 506. A single bit in the bitmap 506 can be used to acknowledge a block. Block sequence numbers of blocks acknowledged in the bitmap 506 correspond to bits in the bitmap 506 in a left-to-right, top-to-bottom order. The bitmap 506 includes a bit for each possible sequence number between the beginning and ending block sequence numbers of an ordered sequence of blocks. In other words, bits in the bitmap represent or acknowledge blocks having sequence numbers that are separated by a minimum step, regardless of whether the step in a particular ordered sequence of blocks is greater than the minimum step. Thus, both used and unused SNs are represented or acknowledged in the bitmap 506.

For example, as shown in FIG. 6, when the RBB field 606 is used to indicate the acknowledgment status of a 12-block sequence that is configured in accordance with the MCS-3 scheme (so that the SNs of the blocks in the 12-block sequence are separated by a step of 3), every third bit in the bitmap 506 indicates the acknowledgment status of a block in a 12-block sequence. As shown in FIG. 6, the sequence starts (as indicated by the SSN 602) with data block 15, and includes blocks having SNs of 15, 18, 21, 24, 27, 30, 33, 36, 39, 42, 45 and 48. As shown in FIG. 6, blocks having SNs of 15, 18, 30 and 39 are each represented by three bits having a zero value, indicating that the blocks having SNs of 15, 18, 30 and 39 are negatively acknowledged (NACKed) and need to be retransmitted. However, unused SNs of 16, 17, 19, 20, 22, 23, 26, 26, 28, 29, 31, 32, 34, 35, 37, 38, 40, 41, 43, 44, 46, 47, 49 and 50 are also acknowledged. Thus, a total of (3)(12)=36 bits in the bitmap 604 are required to indicate the acknowledgment status of a 12-block sequence configured in accordance with the MCS-3 scheme. Other schemes can require even more bits in the bitmap. For example, if a 12-block sequence were configured in accordance with the MCS-6 scheme, a total of (6)(12)=72 bits would be required in the bitmap to acknowledge the 12-block sequence.

In summary, the RBB format shown in FIG. 5 is poorly suited for positively and negatively acknowledging transmitted blocks in a system that uses variable rate data transmission, and skips block sequence numbers depending on the rate used. For example, in situations where the MCS-6 scheme is used and N blocks in a consecutive sequence bear the sequence numbers {6, 12, 18, ... 6*N}, the RBB format would require a separate acknowledgment for each of sequence numbers {1, 2, 3, 4, 5, ... 6*N}, even though only the sequence numbers {6, 12, 18, ... 6*N} need to be considered. Thus, the RBB format requires unnecessarily large overheads when used in a system that employs variable rate data transmission and skips block sequence numbers depending on the rate used.

Accordingly, a need exists for an efficient, low-overhead method and technique for positively and negatively acknowledging transmitted blocks in a system that employs variable rate data transmission and skips block sequence numbers depending on the rate used.

SUMMARY OF THE INVENTION

In accordance with various exemplary embodiments of the invention, a method and technique are provided for efficiently acknowledging transmitted information in a system that employs variable rate data transmission, and skips data block sequence numbers depending on the transmission rate used. In accordance with exemplary embodiments of the invention, the ACK/NACK overhead in a variable rate communication system is reduced by providing an RBB format that is more compact and which can therefore be transmitted and evaluated in less time. This conserves time and computing resources, and allows data to be retransmitted with less delay. In other words, exemplary embodiments of the invention reduce an amount of time between a first transmission of data and a subsequent retransmission of the data.

In accordance with exemplary embodiments of the invention, in a system that employs variable rate data transmission and skips block sequence numbers depending on the data transmission rate used, the skipped block sequence numbers are not acknowledged, thus reducing RBB field sizes in ACK/NACK messages used in the system.

In accordance with an exemplary embodiment of the invention, an RBB field in an ACK/NACK message includes a starting sequence number, an indication of a sequence number step, and a bitmap. The starting sequence number indicates a first block in a series of transmitted blocks that are being acknowledged via the ACK/NACK message. The sequence number step is a minimum difference between sequence numbers of blocks in the series. Where the series is ordered, the sequence number step is a difference between the sequence numbers of adjacent or consecutive blocks in the series. The bitmap can be configured so that each bit in the bitmap represents an acknowledgment of one of the blocks in the series.

In accordance with another exemplary embodiment of the invention, the RBB field in the ACK/NACK message includes multiple starting sequence numbers, and both a sequence number step and a length for each starting sequence number. Each set of starting sequence number, sequence number step and length indicates a subseries or subsequence of the series of transmitted blocks that is being acknowledged via the ACK/NACK message. The starting sequence number indicates a sequence number of a first block in the subsequence, the length indicates how many blocks are in the subsequence, and the sequence number step indicates a difference between sequence numbers of adjacent blocks in the subsequence.

BRIEF DESCRIPTION OF THE DRAWINGS

Other objects and advantages of the present invention will become apparent to those skilled in the art from the following detailed description of preferred embodiments, when read in conjunction with the accompanying drawings wherein like elements have been designated with like reference numerals and wherein:

FIG. 1 shows various payload sizes of different modulation and coding schemes used in the EDGE system.

FIG. 2 shows different block sizes, code rates, and payload sizes for the different modulation and coding schemes used in the EDGE system.

FIG. 3 illustrates a block numbering system that is based on the payload sizes of different blocks, and shows how data can be resegmented into more blocks for retransmission.

FIG. 4 illustrates how data can be resegmented into fewer blocks for retransmission.

FIG. 5 shows a received block bitmap (RBB) format of an RBB field in a positive acknowledgment/negative acknowledgment (ACK/NACK) message, that is known in the prior art.

FIG. 6 shows a specific example of an RBB field in an ACK/NACK message, that has the format shown in FIG. 5.

DETAILED DESCRIPTION OF THE PREFERRED EMBODIMENTS

In accordance with exemplary embodiments of the invention, a single ACK/NACK message is used to positively or negatively acknowledge a plurality of received blocks.

Figure 7:
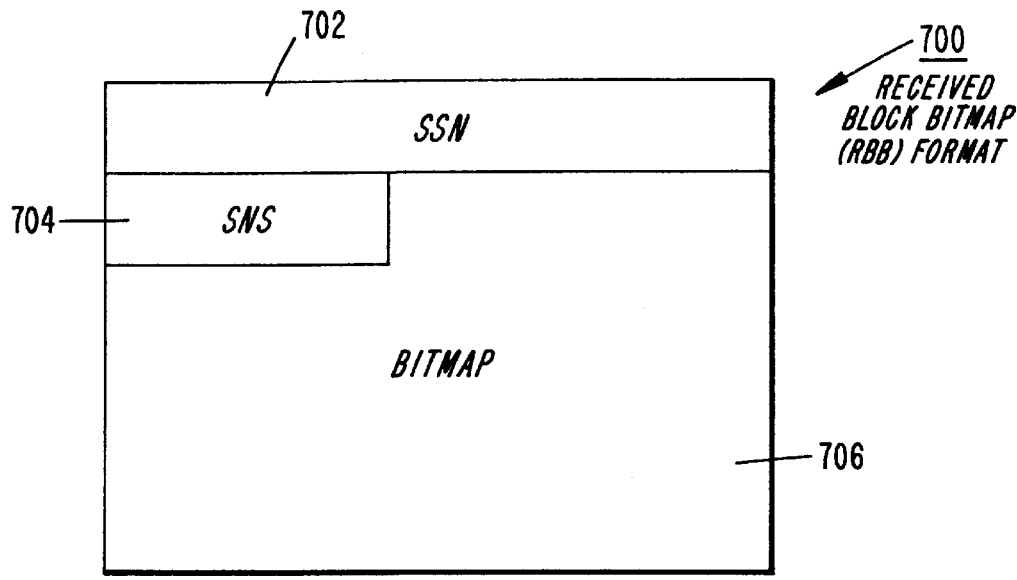
FIG. 7 shows an RBB format of an RBB field in an ACK/NACK message, in accordance with an exemplary embodiment of the invention.

In accordance with a first exemplary embodiment of the invention, a single sequence number step (SNS) is employed. The SNS defines a difference between adjacent sequence numbers in an ordered sequence of block sequence numbers. This concept is illustrated, for example, in FIG. 7. As shown in FIG. 7, an RBB format 700 includes an SSN field 702, an SNS field 704, and a bitmap field 706. The SNS can be, for example, an increment or a decrement, depending on whether the values in the ordered sequence increase or decrease.

Figure 8:
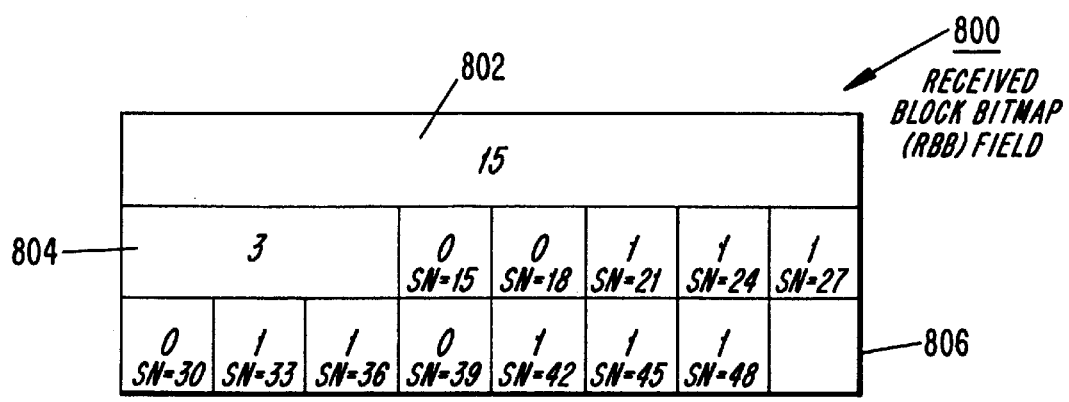
FIG. 8 shows a specific example of an RBB field in an ACK/NACK message, that has the format shown in FIG. 7.

FIG. 8 shows an RBB field 800 having the format 700. The SSN 802 is 15, the SNS 804 is 3, and the bits in the bitmap 806 indicate which of the blocks have been successfully received, and which have not. For example, the bitmap 806 can be configured so that the sequence ascends from left to right and from top to bottom across the bitmap 806, and so that "0" indicates NACK and "1" indicates ACK. Given this configuration, the bitmap 806 indicates that blocks having SNs of 15, 18, 30 and 39 are negatively acknowledged and should therefore be retransmitted, and blocks having SNs of 21, 24, 27, 33, 36, 42, 45 and 48 are positively acknowledged.

When three bits are used to represent the SNS 804, only (3+12)=15 bits total (3 for the SNS 804 and 12 for the bit map 806) are necessary to positively or negatively acknowledge each block in a sequence of 12 blocks having SNs of 15, 18, 21, 24, 27, 30, 33, 36, 39, 42, 45 and 48. In contrast, 34 bits are necessary in the bit map 604 to acknowledge each block in the sequence {15, 18, 21, . . . 48}. This reduction in the number of bits necessary to positively or negatively acknowledge each block in a sequence of blocks reduces overhead and increases efficiency.

Although an example of an SNS having 3 bits is described above, those skilled in the art will recognize that any appropriate number of bits can be chosen to represent the SNS.

As an alternative to explicitly acknowledging the first block in the sequence, as shown for example in FIGS. 7 and 8, the SSN 702 can negatively acknowledge the corresponding block implicitly. For example, where the MCS-3 sequence (15, 18, 21, . . . 45, 48) is to be acknowledged, the first entry in the bitmap 806 would correspond to the block having the SN=18, not SN=15. Of course, the SSN 702 could alternatively be understood to positively acknowledge the corresponding block implicitly.

As an alternative to including an SSN field, it can be understood that the SSN is always 0 (zero). In this case, the SSN field 702 in the RBB format 700 can be omitted.

In accordance with a second exemplary embodiment of the invention, blocks in a sequence of blocks that has different sequence number steps can be positively or negatively acknowledged using the same RBB field. In other words, a single RBB field can be used to acknowledge all blocks in a sequence, where the sequence includes subsequences of blocks and different subsequences can have different sequence number steps.

Figure 9:
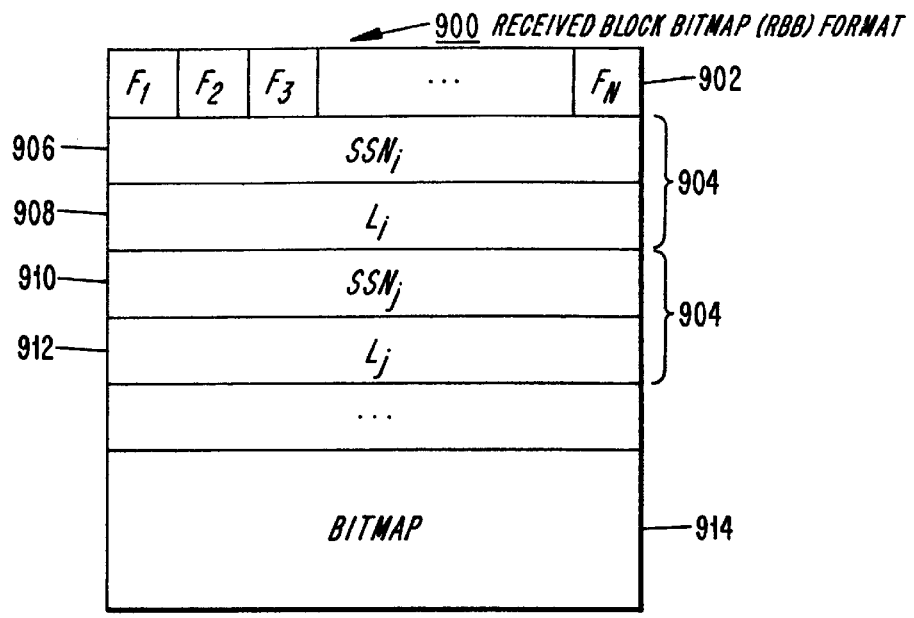
FIG. 9 shows an RBB format of an RBB field in an ACK/NACK message, in accordance with an exemplary embodiment of the invention.

In accordance with the second embodiment of the invention, FIG. 9 shows an exemplary RBB field format 900 for representing a sequence of blocks, where the sequence can include subsequences of blocks that can each have a different sequence number step.

As shown in FIG. 9, the RBB field format 900 also includes a step flags field 902. Each bit in the step flags field 902 represents a different possible sequence number step, and functions as a flag for that step. The step flags field 902 can be configured so that when a bit in the step flags field 902 is "1", the corresponding flag is set, and when the bit is "0", the corresponding flag is not set.

Each subsequence of blocks in the sequence is defined using a pair 904 of a starting sequence number (SSN) of a first block in the subsequence, a number of blocks L in the subsequence, and one of the flags in the step flags field 902. For example, the RBB field format can be configured so that a first set flag in the step flags field 902 corresponds to a first pair 904, a second set flag in the step flags field 902 corresponds to a second pair 904, and so forth. The "first" set flag can be, for example, the first flag encountered when moving from left to right across the field 902 that is set. The "first" pair 904 can be, for example, the first pair 904 encountered when moving from top to bottom through a sequence of pairs 904 in the RBB field 900. For example, the first pair 904 can be the pair 904 including the SSN field 906 and the length field 908 as shown in FIG. 9.

Thus, the first set flag indicates the sequence number step for the subsequence of blocks corresponding to the first pair 904 and the first set flag. Likewise, the second set flag indicates the sequence number step for the subsequence of blocks corresponding to the second pair 904, and so forth.

The SSN fields 906 and 910 of the pairs 904 can contain different SSNs from different subsequences, and the length fields 908 and 912 can each contain a number indicating a length of a corresponding subsequence. The length of the subsequence can be, for example, a number of blocks in the subsequence. All of the blocks in the subsequences are acknowledged using bits in the bitmap 914.

Figure 10:
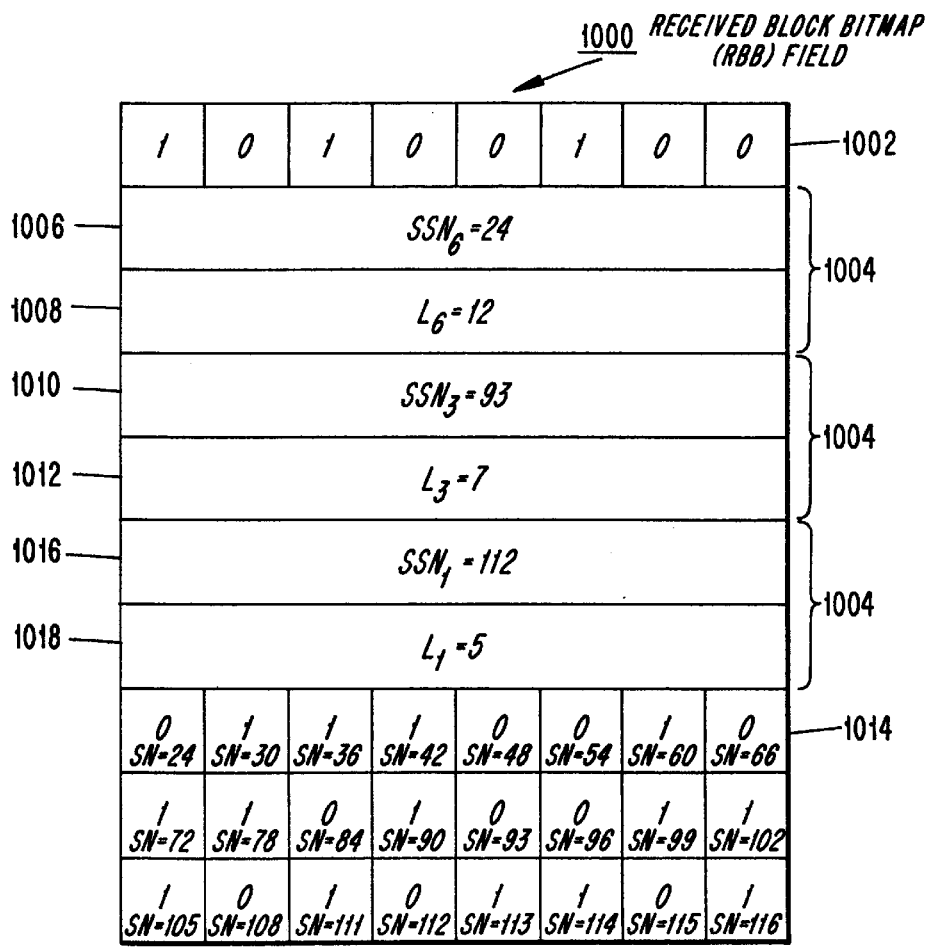
FIG. 10 shows a specific example of an RBB field in an ACK/NACK message, that has the format shown in FIG. 9.

FIG. 10 shows an exemplary RBB field 1000 having the format 900. As shown in FIG. 10, the step flags field 902 indicates which sequence number steps are present in a sequence of blocks represented by the field 1000. The step flags field 902 represents steps in ascending value from left to right. For example, the flags corresponding to the steps or step values 1, 3 and 6 are set equal to "1", indicating that the sequence contains subsequences having the steps 1, 3 and 6. Pairs 1004 correspond to the steps present in the sequence, and are ordered in the field 1000 from top to bottom in descending step value.

For example, the uppermost pair 1004 of an SSN 1006 and an L 1008 corresponds to the step having a value of 6. The value 24 of the SSN 1006 indicates that the first block in the subsequence has an SN of 24. The value 12 of the length L 1008 indicates that the subsequence is 12 blocks long. Thus, the step 6 and the SSN 1006 and the L 1008 of the uppermost pair 1004, together represent or define a subsequence of blocks having SNs of 24, 30, 36, 42, 48, 54, 60, 66, 72, 78, 84 and 90.

Similarly, the pair 1004 of an SSN 1010=93, an L 1012=7 and the step 3 represent a subsequence of blocks having SNs of 93, 96, 99, 102, 105, 108 and 111.

The pair 1004 of an SSN 1016=112, and L 1018=5 and the step 1 represent a subsequence of blocks having SNs of 112, 113, 114, 115 and 116.

A bitmap 1014 indicates which blocks in the sequence are positively acknowledged, and which are negatively acknowledged. For example, the bitmap 1014 is configured so that a bit value of "1" indicates that a corresponding block is positively acknowledged, and a bit value of "0" indicates that a corresponding block is negatively acknowledged. The subsequences represented in top to bottom order of the pairs 1004 are represented in left to right and top to bottom order in the bitmap 1014. In addition, the block SNs within the subsequences are represented in ascending order left to right and top to bottom in the bitmap 1014.

Thus, as can be seen in FIG. 10, the bits in the bitmap 1014 indicate that blocks having the SNs of 24, 48, 54, 66, 84, 93, 96, 108, 112 and 115 are negatively acknowledged and need to be retransmitted.

The steps represented in the step flags field 902 and the subsequences represented by the pairs 904 can be ordered in any appropriate fashion. For example, as an alternative to the orders described above, the step flags field 902 can represent steps in descending order from left to right, and the pairs 904 can be arrayed in order of occurrence or correspondence from bottom to top instead of top to bottom.

As an alternative to flags, the field 902 can contain actual step values instead of single-bit flags. In this case each step value, together with a corresponding pair 904, defines a subsequence of blocks. The step values can be ordered in the field 902 so that a first step value in the field 902 corresponds to a first pair 904 and helps define a first subsequence of blocks in a sequence, a second step value in the field 902 corresponds to a second pair 904 and helps define a second subsequence, and so forth. Furthermore, as an alternative to grouping the step values in the field 902, each of the step values can be located with a corresponding pair SNS and length values.

Figure 11A:
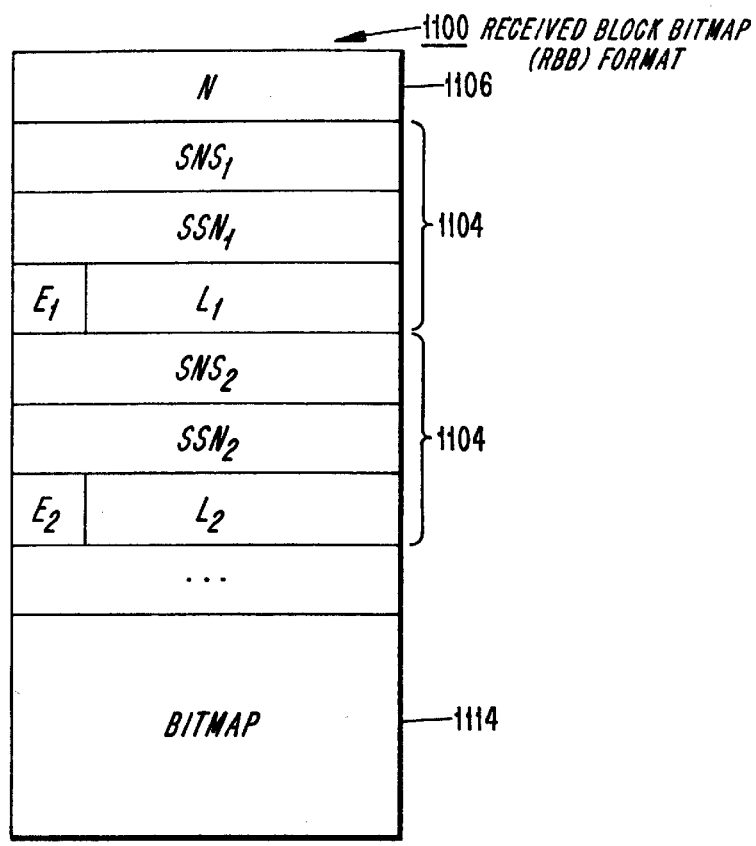
FIG. 11A shows an RBB format of an RBB field in an ACK/NACK message, in accordance with an exemplary embodiment of the invention.

For example, as illustrated in FIG. 11A, an RBB format 1100 in accordance with an embodiment of the invention, includes triples 1104 that each define a subsequence in a sequence of blocks. Each triple includes a sequence number step SNS, a sequence number of a first block in the subsequence (e.g., an SSN), and a length L of the subsequence. The RBB format 1100 can also contain a field 1106 containing a number N that indicates how many subsequences are in the sequence of blocks acknowledged and/or represented. As an alternative to the field 1106, each triple 1104 can also include a bit field E, to indicate whether the bitmap will immediately follow. Thus, one of the field 1106 and the bit fields E can be omitted. Other appropriate mechanisms can alternatively be provided to indicate a location of the bitmap in the RBB format 1100.

Figure 11B:
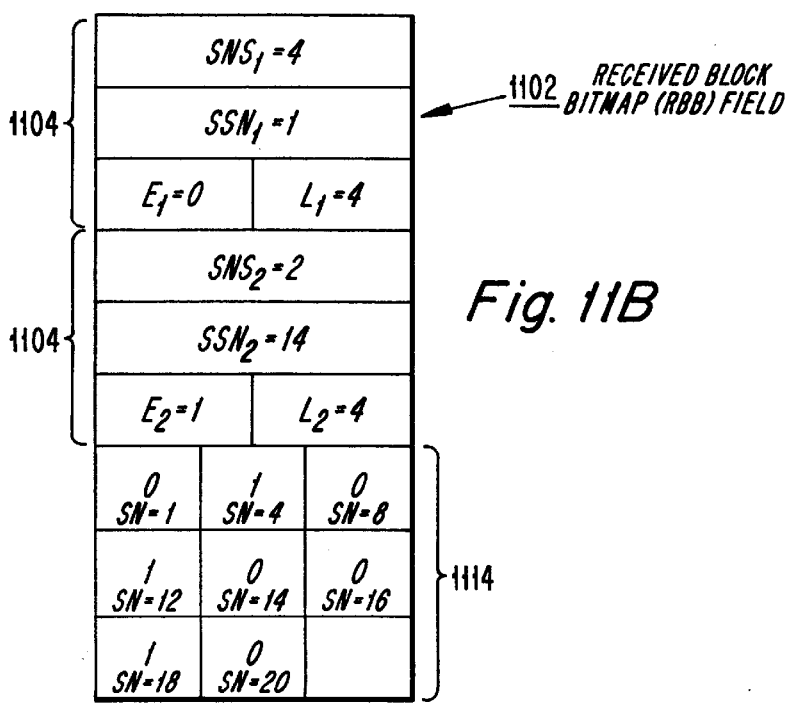
FIG. 11B shows a specific example of an RBB field in accordance with the RBB format shown in FIG. 11A.

FIG. 11B shows an example RBB field 1102 in accordance with the RBB format 1100, which contains two triplets 1104. The first triplet 1104 indicates that the subsequence it defines starts with SN=1, has an SNS=4, and has a length of 4 (i.e., there are 4 sequence numbers or blocks in the subsequence). The bit value E=0 indicates that the first triplet 1104 is not followed by the bitmap. The second triplet indicates that the subsequence it defines starts with SN=14, has an SNS=2, and has a length of 4. The bit value E=1 indicates that the bitmap 1114 does immediately follow the second triplet 1104, and the bitmap 1114 indicates that blocks having sequence numbers of 1, 8, 14, 16 and 20 need to be retransmitted.

As an alternative, the bitmap 1114 can be replaced with a list of sequence numbers that correspond to blocks in the subsequences defined by the triplets 1104, which need to be retransmitted. If for example this technique were applied to the RBB field shown in FIG. 11B, then the list of sequence numbers would include 1, 8, 14, 16 and 20. Where the RBB field acknowledges a large number blocks and a percentage of blocks that need to be retransmitted is low, this technique can be more efficient than using the bitmap 1114.

Figure 12:
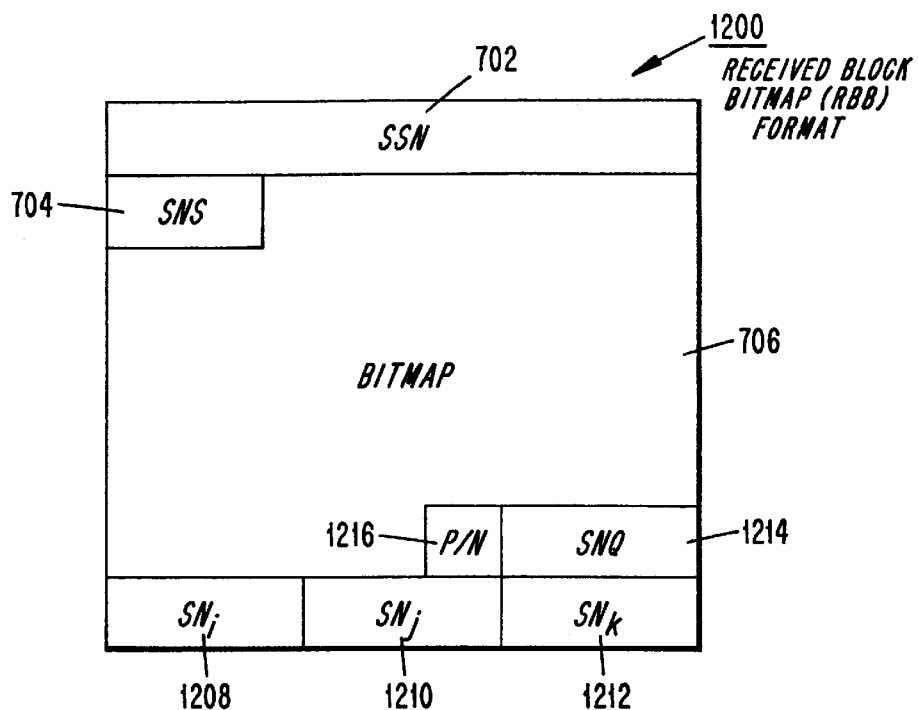
FIG. 12 shows an RBB format of an RBB field in an ACK/NACK message, in accordance with an exemplary embodiment of the invention.

In accordance with another embodiment of the invention, an RBB format can include explicit sequence numbers, whose presence acknowledges the corresponding blocks. FIG. 12 shows, for example, an RBB format 1200 that is similar to the RBB format 700, but also includes a list of explicit sequence number fields 1208, 1210 and 1212 which contain sequence numbers $SN_i$, $SN_j$ and $SN_k$. Any appropriate number of explicit sequence number fields can be included, and the RBB format 1200 can optionally include a sequence number quantity (SNQ) 1214 that indicates how may explicit sequence numbers follow the bitmap 706. The acknowledgment can be understood to be negative, or alternatively to be positive, or can be indicated by an optional bit P/N 1216 whose value indicates whether the acknowledgment is negative or positive.

Figure 13:
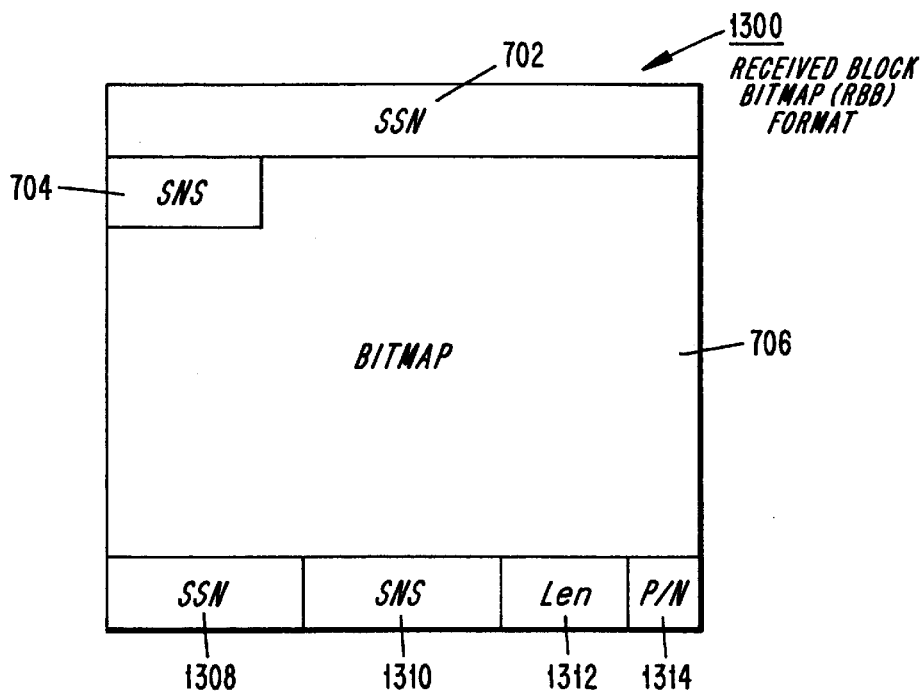
FIG. 13 shows an RBB format of an RBB field in an ACK/NACK message, in accordance with an exemplary embodiment of the invention.

An accordance with another embodiment of the invention, an RBB format can include parameters that explicitly identify a sequence of sequence numbers that are all positively acknowledged or all negatively acknowledged. For example, as shown in FIG. 13, an RBB format 1300 that is similar to the RBB format 700 also includes a set of parameters that defines a sequence of sequence numbers. The set includes, for example, an SSN field 1308 that contains a starting sequence number, an SNS field 1310 that indicates a sequence number step for the sequence or subsequence, and a length field Len 1312 that indicates how many sequence numbers are in the sequence or subsequence. The field Len 1312 can alternatively contain a sequence number of a last block in the sequence. The acknowledgment (positive or negative) for all the blocks in the sequence can be understood, or can be indicated by an optional bit P/N 1314 whose value indicates whether the acknowledgment is negative or positive.

The techniques illustrated in FIGS. 12 and 13 can also be implemented with other embodiments of the invention described above, besides the embodiment shown in FIG. 7. As a further alternative, when the techniques illustrated in FIGS. 12 and 13 are used the bitmap field 706 and the SSN and SNS fields 702 and 704 can be omitted entirely.

In accordance with different embodiments of the invention, the order of elements within the RBB field can be varied, and the order of SNs within the RBB field can also be varied. For example, the bits in the field 1002 can alternatively represent steps that descend in value from left to right across the field 1002. Sequence numbers represented in the bitmaps can descend from left to right, and/or from top to bottom within each subsequence.

Where an RBB field applies to a sequence of blocks and includes different steps where each subsequence in the sequence of blocks has a single step, the subsequences can also be represented in the RBB field in different orders. For example, the subsequences can appear (as represented by information such as the pairs 1004, and/or as represented by corresponding portions in the bitmap of the RBB field) ordered in ascending or descending order by step, or by SSN. Furthermore, instead of a starting sequence number corresponding to the sequence number of a first block in a sequence or subsequence, the sequence number of a final block in the sequence or subsequence can be used.

In general, information contained in fields or subfields within exemplary RBB field formats in accordance with various embodiments of the invention, can be ordered in any appropriate way. Information within those fields or subfields can likewise be ordered in any appropriate way.

Where, in accordance with exemplary embodiments of the invention, actual values instead of flags are stored within an RBB field, numbers of bits used to represent the values can be chosen appropriately. For example, with respect to an SNS field that stores a starting sequence number of a block in a sequence or subsequence, the size of the SNS field, for example the number of bits used to represent the value stored in the SNS field, can be appropriately selected to be a minimum number that is sufficient to represent a largest SN of a first block in the sequence or subsequence.

In accordance with an embodiment of the invention, instead of using "0" to represent a negative acknowledgment and "1" to represent a positive acknowledgment, "0" can be used to represent a positive acknowledgment and "1" can be used to represent a negative acknowledgment.

In accordance with an embodiment of the invention, where one or more sequence number steps indicated in the RBB field represent step magnitudes, the RBB field can include a separate indication for each step, or in the alternative can include an indication that applies all of the steps, indicating whether the corresponding step(s) is a decrement or an increment.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method of acknowledging a plurality of received data blocks in a communication system, comprising the step of:
    generating a single positive acknowledgment/negative acknowledgment (ACK/NACK) message that indicates an ACK/NACK status of only the plurality of received data blocks;
    wherein the ACK/NACK message comprises:
        (a) a plurality of flags, each flag indicating that a corresponding sequence number step is represented in the ACK/NACK message;
        (b) for each sequence number step indicated by one of the plurality of flags as being represented in the ACK/NACK message:
            a start sequence number field that corresponds to one of a number of possible sequence number steps; and
            a length field, indicating a number of blocks; and
        (c) a bitmap field for indicating an acknowledgment status for each of a plurality of received data blocks designated by the flags, start sequence number fields and length fields.

2. The method of claim 1, wherein a value in the start sequence number field is a sequence number of one of plurality of received data blocks.

3. A method of acknowledging a plurality of received data blocks in a communication system, comprising the step of:
    generating a single positive acknowledgment/negative acknowledgment (ACK/NACK) message that indicates an ACK/NACK status of only the plurality of received data blocks;
    wherein the ACK/NACK message comprises:
        (a) a plurality of start sequence number fields, each start sequence number field indicating a first data block of an ordered subset of the plurality of received data blocks;
        (b) for each of the plurality of start sequence number fields:
            a length field indicating a number of data blocks in the corresponding ordered subset of the plurality of received data blocks; and
            a flag indicating a sequence number step for the ordered subset; and
        (c) a bitmap field indicating an acknowledgment status for each of the plurality of received data blocks designated by the start sequence number fields, length fields and flags.

4. A method of acknowledging a plurality of received data blocks in a communication system, comprising the step of:
    generating a single positive acknowledgment/negative acknowledgment (ACK/NACK) message that indicates an ACK/NACK status of only the plurality of received data blocks;
    wherein the ACK/NACK message comprises:
        (a) a plurality of start sequence number fields, each start sequence number field indicating a first data block of an ordered subset of the plurality of received data blocks;
        (b) for each of the plurality of start sequence number fields:
            a length field indicating a number of data blocks in the corresponding ordered subset of the plurality of received data blocks; and
            a sequence number step field containing a value equal to a magnitude of a sequence number step for the ordered subset; and
        (c) a bitmap field indicating an acknowledgment status for each of the plurality of received data blocks designated by the start sequence number fields and length fields.

5. The method of claim 4, wherein for each ordered subset of the plurality of received data blocks, a difference between sequence numbers of adjacent data blocks in the ordered subset is equal in magnitude to the value in the sequence number step field corresponding to the ordered subset.

6. The method of claim 4, wherein the ACK/NACK message further comprises an indication of a number of the ordered subsets of the plurality of received data blocks.

7. The method of claim 4, wherein the ordered subsets are mutually exclusive.

8. An apparatus for acknowledging a plurality of received data blocks in a communication system, comprising:
    means for generating a single positive acknowledgment/negative acknowledgment (ACK/NACK) message that indicates an ACK/NACK status of only the plurality of received data blocks;
    wherein the ACK/NACK message comprises:
        (a) a plurality of flags, each flag indicating that a corresponding sequence number step is represented in the ACK/NACK message;
        (b) for each sequence number step indicated by one of the plurality of flags as being represented in the ACK/NACK message:
            a start sequence number field that corresponds to one of a number of possible sequence number steps; and
            a length field, indicating a number of blocks; and
        (c) a bitmap field for indicating an acknowledgment status for each of a plurality of received data blocks designated by the flags, start sequence number fields and length fields.

9. The apparatus of claim 8, wherein a value in the start sequence number field is a sequence number of one of the plurality of received data blocks.

10. An apparatus for acknowledging a plurality of received data blocks in a communication system, comprising:
   means for generating a single positive acknowledgment/ negative acknowledgment (ACK/NACK) message that indicates an ACK/NACK status of only the plurality of received data blocks;
   wherein the ACK/NACK message comprises:
   (a) a plurality of start sequence number fields, each start sequence number field indicating a first data block of an ordered subset of the plurality of received data blocks;
   (b) for each of the plurality of start sequence number fields:
      a length field indicating a number of data blocks in the corresponding ordered subset of the plurality of received data blocks; and
      a flag indicating a sequence number step for the ordered subset; and
   (c) a bitmap field indicating an acknowledgment status for each of the plurality of received data blocks designated by the start sequence number fields, length fields and flags.

11. An apparatus for acknowledging a plurality of received data blocks in a communication system, comprising:
   means for generating a single positive acknowledgment/ negative acknowledgment (ACK/NACK) message that indicates an ACK/NACK status of only the plurality of received data blocks;
   wherein the ACK/NACK message comprises:
   (a) a plurality of start sequence number fields, each start sequence number field indicating a first data block of an ordered subset of the plurality of received data blocks;
   (b) for each of the plurality of start sequence number fields:
      a length field indicating a number of data blocks in the corresponding ordered subset of the plurality of received data blocks; and
      a sequence number step field containing a value equal to a magnitude of a sequence number step for the ordered subset; and
   (c) a bitmap field indicating an acknowledgment status for each of the plurality of received data blocks designated by the start sequence number fields and length fields.

12. The apparatus of claim 11, wherein for each ordered subset of the plurality of received data blocks, a difference between sequence numbers of adjacent data blocks in the ordered subset is equal in magnitude to the value in the sequence number step field corresponding to the ordered subset.

13. The apparatus of claim 11, wherein the ACK/NACK message further comprises an indication of a number of the ordered subsets of the plurality of received data blocks.

14. The apparatus of claim 11, wherein the ordered subsets are mutually exclusive.

\* \* \* \* \*